(12) United States Patent
Oh et al.

(10) Patent No.: US 9,550,529 B2
(45) Date of Patent: Jan. 24, 2017

(54) APPARATUS AND METHOD FOR RECOGNIZING DRIVING FIELD OF VEHICLE

(71) Applicant: Hyundai Motor Company, Seoul (KR)

(72) Inventors: Young Chul Oh, Gyeonggi-do (KR); Tae Sung Choi, Gyeongsangnam-do (KR); Byung Yong You, Gyeonggi-do (KR); Chang Young Jung, Busan (KR); Su Rim Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/323,350

(22) Filed: Jul. 3, 2014

(65) Prior Publication Data

US 2015/0175204 A1    Jun. 25, 2015

(30) Foreign Application Priority Data

Dec. 24, 2013  (KR) .......................... 10-2013-0162430

(51) Int. Cl.
*B62D 15/02*    (2006.01)
*G08G 1/16*     (2006.01)

(52) U.S. Cl.
CPC ............ *B62D 15/029* (2013.01); *G08G 1/167* (2013.01)

(58) Field of Classification Search
CPC ............. G01C 21/3647; G01C 21/365; G08G 1/096861; G08G 1/0969; G08G 1/167; B62D 15/029
See application file for complete search history.

(56) References Cited

U.S. PATENT DOCUMENTS

| 2008/0195315 | A1* | 8/2008 | Hu et al. ...................... 701/212 |
| 2014/0156182 | A1* | 6/2014 | Nemec .................. G05D 1/021 |
| | | | 701/430 |

FOREIGN PATENT DOCUMENTS

| JP | 2010069922 A | 4/2010 |
| JP | 2010070012 A | 4/2010 |
| JP | 2012-127772 A | 7/2012 |
| JP | 2013097714 A | 5/2013 |
| JP | 2013168016 A | 8/2013 |
| KR | 10-2010-0063372 | 6/2010 |
| KR | 10-2010-0131681 A | 12/2010 |
| KR | 10-2013-0015746 | 2/2013 |
| KR | 10-2013-0021987 | 3/2013 |
| KR | 10-2013-0054660 | 5/2013 |

* cited by examiner

*Primary Examiner* — Basil T Jos
(74) *Attorney, Agent, or Firm* — Mintz Levin Cohn Ferris Glovsky and Popeo, P.C.; Peter F. Corless (57) ABSTRACT

An apparatus and method for recognizing a driving field of a vehicle are provided. The apparatus includes a sensor that is configured to sense a location of a vehicle driving on a road and sense whether an object is adjacent to the vehicle. In addition, a controller is configured to detect whether the object is present and a lane of the road on which the vehicle is being driven is changed to detect a final lane candidate group on which the vehicle is positioned. The final lane candidate group is then displayed by the controller.

10 Claims, 6 Drawing Sheets

APPARATUS AND METHOD FOR RECOGNIZING DRIVING FIELD OF VEHICLE

CROSS-REFERENCE TO RELATED APPLICATION

This application is based on and claims priority from Korean Patent Application No. 10-2013-0162430, filed on Dec. 24, 2013 in the Korean Intellectual Property Office, the disclosure of which is incorporated herein in its entirety by reference.

BACKGROUND

Field of the Invention

The present invention relates to an apparatus and method for recognizing a driving field of a vehicle, and more particularly, to an apparatus and method that recognize a driving field of a vehicle, to extract locations of road lanes, other vehicles, and a guard rail, adjacent to a vehicle using a global positioning system (GPS), an image sensor, and a radar sensor to detect a driving field of the vehicle.

Description of the Prior Art

In general, while a vehicle drives, a driving field (e.g., the area along the path on which the vehicle is traveling) of the vehicle is estimated using a global positioning system (GPS) installed in a navigation device for guidance for stopping on a road shoulder, accurate guidance for entrance and exit onto interchange (IC)/junction (JC), and accurate guidance for a path to a destination, or is estimated using sensors installed within the vehicle, such as an image recognition sensor, a radar sensor, or the like.

In particular, when a driving field of a vehicle is estimated using a GPS, it may be difficult to estimate an accurate lane of a road on which the vehicle drives due to errors of the GPS. In addition, when a driving field of a vehicle is estimated using a sensor such as an image recognition sensor, a radar sensor, or the like, it may be difficult to estimate a road lane on which numerous vehicles are present and to estimate a lane while the vehicle is being driven on an intermediate lane on a road with having a plurality of lanes.

SUMMARY

Accordingly, the present invention provides an apparatus and method for recognizing a driving field of a vehicle, to extract locations of road lanes, other vehicles, and a guard rail, adjacent to a vehicle using a global positioning system (GPS), an image sensor, and a radar sensor to check a driving field of the vehicle. In addition, the present invention provides an apparatus and method for recognizing a driving field of a vehicle, to track whether to change a lane in real time to detect a driving field of the vehicle.

In one aspect of the present invention, an apparatus for recognizing a driving field of a vehicle may include a sensor configured to sense a location of a vehicle driving on a road and sense whether an object adjacent to the vehicle is present, a controller configured to detect whether the object is present and whether a lane of the road on which the vehicle is driven is changed to detect a final lane candidate group on which the vehicle is positioned, and an output unit executed by the controller to display the final lane candidate group.

The controller may also be configured to set a virtual road having the same number of lanes as the detected lane of the road, containing a lane of the vehicle (e.g., a lane in which the vehicle is being driven), a lane on the right and left side of the vehicle, and a virtual road having at least one lane, and detect a previous lane candidate group based on the detected object. The controller may be configured to detect a first lane candidate group using the same method as a method for detecting the previous lane candidate group when the lane of the road on which the vehicle is being driven is changed, and reduce and increase the number of lanes by as much as the changed number from the previous lane candidate group to detect the second lane candidate group. The controller may be configured to detect a first lane candidate group using the same method as a method for detecting the previous lane candidate group when the lane of the road on which the vehicle is being driven is not changed, and set the previous lane candidate group as the second lane candidate group. The controller may also be configured to combine the first lane candidate group and the second lane candidate group to detect the final lane candidate group. The object may include a vehicle object adjacent to the vehicle and a still object including a guard rail and a median strip positioned on the road on which the vehicle is positioned.

In another aspect of the present invention, a method for recognizing a driving field of a vehicle may include entering, by a controller, a driving field recognition mode according to external input, detecting, by the controller, a position of a vehicle driving a road, detecting, by the controller, whether an object is present adjacent to the vehicle, determining, by the controller, whether to change a lane of a road on which the vehicle is being driven, combining, by the controller, results to detect a final lane candidate group on which the vehicle is positioned, and displaying, by the controller, the detected final lane candidate group.

The method may further include detecting, by the controller, a previous lane candidate group after the detecting whether the object is present. The detection of the previous lane candidate group may include detecting a lane of a road on which the vehicle is positioned, additionally setting a virtual road having the same number of lanes as the detected lane of the road on the right and left side of the vehicle, and a virtual road having at least one lane, and detecting the previous lane candidate group based on the object on the virtual road.

The method may further include detecting, by the controller, a first lane candidate group and a second lane candidate group after the detection of whether to change the lane of the road. The detection of the first lane candidate group and the second lane candidate group may include detecting, by the controller, a first lane candidate group using the same method as a method for detecting the previous lane candidate group in response to detecting that the lane of the road on which the vehicle is being driven is changed, and reducing and increasing the number of lanes by as much as the changed number from the previous lane candidate group to detect the second lane candidate group, and detecting a first lane candidate group using the same method as a method for detecting the previous lane candidate group in response to not detecting that the lane of the road on which the vehicle is being driven is changed, and setting the previous lane candidate group as the second lane candidate group. The detection of the final lane candidate group may include combining the first lane candidate group and the second lane candidate group to detect the final lane candidate group.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings. With regard to the description of the exemplary embodiments of the present invention, technical features that are well known to those of ordinary skill in the art and are not directly associated with the present invention are not described here. In the description of the present invention, detailed explanations of related art are omitted for clarity when it is deemed that they may unnecessarily obscure the essence of the invention.

Figure 1:
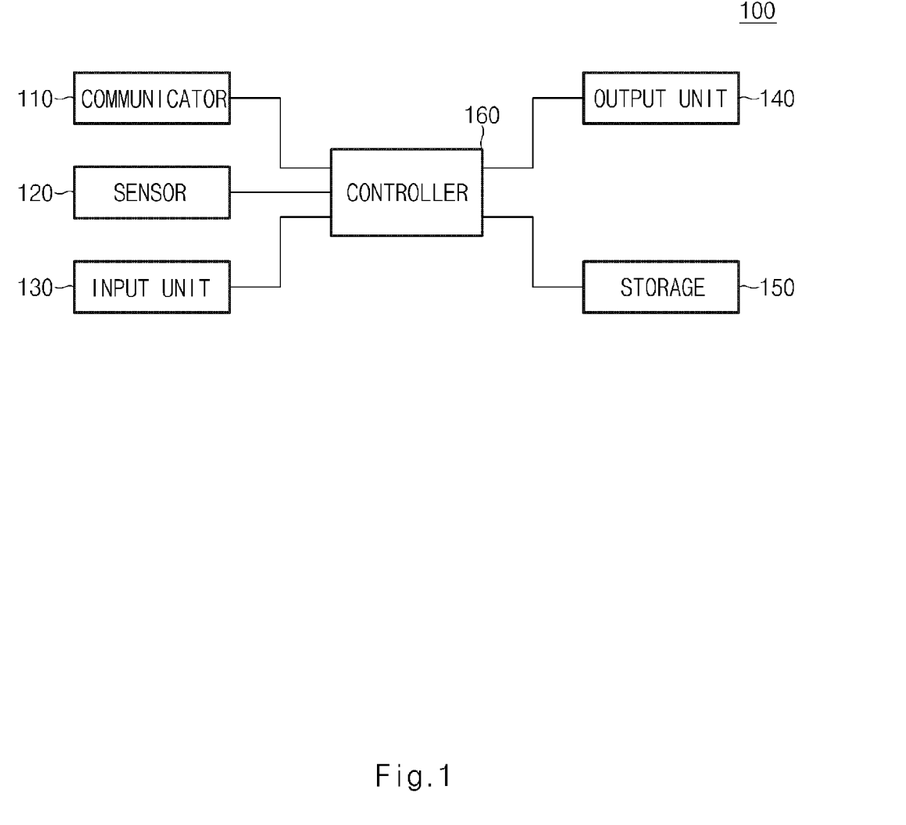
FIG. 1 is an exemplary diagram illustrating a main configuration of a driving field recognizing apparatus according to an exemplary embodiment of the present invention.

FIG. 1 is an exemplary diagram illustrating a main configuration of a driving field recognizing apparatus 100 according to an exemplary embodiment of the present invention. Referring to FIG. 1, the driving field recognizing apparatus 100 according to the present exemplary embodiment may include a communicator 110, a sensor 120, an input unit 130, an output unit 140, a storage 150, and a controller 160. In this specification, for convenience of description, the driving field recognizing apparatus 100 is used, but embodiments of the present invention are not limited thereto. In general, the exemplary embodiments of the present invention may be applied to audio, video, and navigation (AVN) devices installed within a vehicle.

The communicator 110 may be configured to perform controller area network (CAN) communication for communication between the sensor 120 and the controller 160. The sensor 120 may be configured to sense a location of a vehicle being driven on a road and sense an object adjacent to the vehicle. Accordingly, the sensor 120 may include a global positioning system (GPS) sensor, an image sensor, and a radar sensor. The GPS sensor may be installed within the vehicle and may be configured to convert a substantially accurate location of the measured vehicle into a coordinate value according to operation of the controller 160. The image sensor may be configured to obtain image data of the front of a road on which the vehicle is being driven based on operation of the controller 160. The radar sensor may be installed in the front of the vehicle and may be configured to measure presence of a still object including a vehicle object, a median strip, and a guardrail, adjacent to the vehicle. The radar sensor may use light detection and ranging (LiDAR) laser radar. However, the radar sensor is not limited thereto, and thus, may use various sensors corresponding thereto.

The input unit 130 may be configured to receive a signal for entrance of the vehicle to a driving field recognition mode from a driver. In particular, the input unit 130 may be configured by a keypad, a touchpad, a touchscreen, or the like. When the input unit 130 is configured by a touchscreen, the input unit 130 may also perform a function of the output unit 140. The output unit 140 may be configured to output the image data acquired by the image sensor, provide the image data to the driver, and output information about a confirmed lane of a road on which the vehicle is being driven based on the operation of the controller 160.

The storage 150 may be configured to store map data received from a map server (not shown) for providing the map data, extract map data that corresponds to a current location of the vehicle, and provide the map data to the controller 160 according to operation of the controller 160. In addition, the storage 150 may be configured to store a program and the like for recognition of information of the lane of the road on which the vehicle is being driven. In addition, the storage 150 may be configured to store a previous lane candidate group of the vehicle, detected by the controller 160.

The controller 160 may be configured to detect presence of an object and whether to change a lane of a road on which the vehicle is being driven to detect a final lane candidate group of a road in which the vehicle is positioned. In particular, upon receiving a signal for entrance to a driving field recognition mode from the input unit 130, the controller 160 may be configured to enter the driving field recognition mode and operate the sensor 120. The controller 160 may be configured to operate the GPS sensor, the image sensor, and the radar sensor, included within the sensor 120, to receive sensing information from each sensor. The controller 160 may be configured to detect a current location of the vehicle from the sensing information received from the GPS sensor and access map data that corresponds to the detected current location from the storage 150 to determine the number of lanes of the road on which the vehicle is being driven.

The controller 160 may be configured to set a driving field for detection of an object. In particular, the controller 160 may be configured to additionally set a virtual road having the same number of lanes as the detected number of lanes and a virtual road having at least one lane to set the driving field of the object. For example, for a four-lane road, the controller 160 may be configured to virtually generate four lanes containing the vehicle on the left side of the vehicle based on the vehicle position and virtually generate four lanes containing the vehicle on the right side of the vehicle based on the vehicle position. In addition, the controller 160 may be configured to virtually generate one lane for a median strip and two lanes for a guardrail and a road shoulder. In particular, an object including the median strip and guardrail positioned in a road may be referred to as a still object.

The controller 160 may be configured to analyze the sensing information received from the radar sensor and the image sensor to detect a vehicle object positioned adjacent to the vehicle and a still object present on the right and left side of the vehicle based on the vehicle position. The controller 160 may be configured to detect whether the still object is present on the right and left side of the vehicle. When a still object is not present on the right and left of the vehicle, the controller 160 may be configured to detect the previous lane candidate group based on a moving vehicle object adjacent to the vehicle being driven. On the other hand, when a still object is present on the right and/or left side of the vehicle, the controller 160 may be configured to detect previous lane candidates based on the still object and vehicle object present on the right and left side of the vehicle.

Further, the controller 160 may be configured to detect whether the vehicle changes a lane. The controller 160 may be configured to detect a first lane candidate group irrespective of whether the vehicle changes a lane. Additionally, the controller 160 may be configured to detect the first lane candidate group using the same method as a method of detecting the previous lane candidate group. When the lane of the vehicle is changed, the controller 160 may be configured to detect a second lane candidate group. In particular, when the vehicle changes a lane to the left, the controller 160 may be configured to reduce the number of lanes from the previously-detected previous lane candidate group to detect the second lane candidate group. In addition, when the vehicle changes a lane to the right, the controller 160 may be configured to increase the number of lanes from the previous lane candidate group to detect the second lane candidate group. On the other hand, when the vehicle does not change a lane, the controller 160 may be configured to set the previous lane candidate group as the second lane candidate group. The controller 160 may be configured to set a final lane candidate group using a combination of the first lane candidate group and the second lane candidate group and display the final lane candidate group on the output unit 140.

Figure 2:
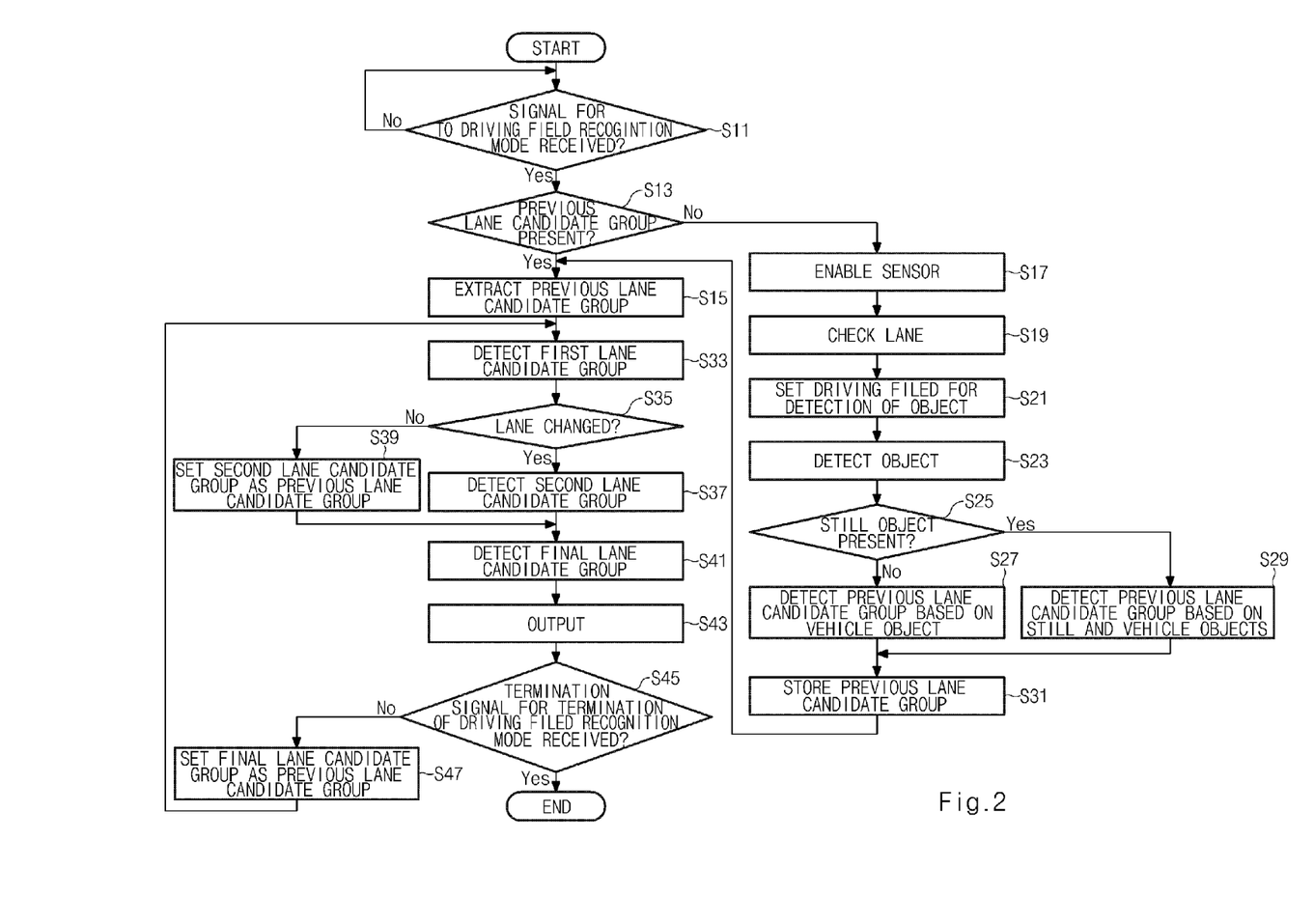
FIG. 2 is an exemplary flowchart illustrating a method of recognizing a driving field of a vehicle according to an exemplary embodiment of the present invention.

FIG. 2 is an exemplary flowchart illustrating a method of recognizing a driving field of a vehicle according to an exemplary embodiment of the present invention. Referring to FIGS. 1 and 2, in operation S11, the controller 160 may be configured to determine a signal for entrance to a driving field recognition mode from the input unit 130 and enter the driving field recognition mode in response to receiving the signal. In operation S13, the controller 160 may be configured to detect whether a current mode is a state in which the previous lane candidate group is stored in the storage 150. As the detection result of operation S13, when the current mode is the state in which the previous lane candidate group is stored in the storage 150, the controller 160 may proceed to operation S15 to extract the previous lane candidate group and proceed to operation S33.

Furthermore, as the detection result of operation S13, when the current mode is not the state in which the previous lane candidate group is stored in the storage 150, the controller 160 may proceed to operation S17 to operate the sensor 120. The controller 160 may be configured to operate the GPS sensor, the image sensor, and the radar sensor, included within the sensor 120, to receive sensing information from each sensor. In operation S19, the controller 160 may be configured to detect the number of lanes of a road on which the vehicle is being driven. Accordingly, the controller 160 may be configured to detect a current location of the vehicle from the sensing information received from the GPS sensor and access map data that corresponds to the detected current location from the storage 150 to detected the number of lanes of the road on which the vehicle is being driven.

In operation S21, the controller 160 may be configured to set a driving field for detection of an object. In particular, the controller 160 may be configured to additionally set a virtual road having the same number of lanes as the detected number of lanes and a virtual road having at least one lane to set the driving field of the object. For example, for a four-lane road, the controller 160 may be configured to virtually generate four lanes containing the vehicle on the left side of the vehicle being driven based on the vehicle position and virtually generate four lanes containing the vehicle on the right side of the vehicle being driven based on the vehicle position. In addition, the controller 160 may be configured to virtually generate one lane for a median strip and two lanes for a guardrail and a road shoulder. In particular, an object including the median strip and guardrail positioned in a road may be referred to as a still object.

In operation S23, the controller 160 may be configured to detect an object. In particular, the controller 160 may be configured to analyze the sensing information received from the radar sensor and the image sensor to detect a vehicle object positioned adjacent to the vehicle being driven and a still object present on the right and left of the vehicle based on the vehicle position. In operation S25, the controller 160 may be configured to detect whether the still object is present on the right and left side of the vehicle based on the detection result of operation S23. As the detection result of operation S25, when a still object is not present on the right and left side of the vehicle, the controller 160 may proceed to operation S27. When the still object is present on the right and left side of the vehicle, the controller 160 may proceed to operation S29. In operation S27, the controller 160 may be configured to detect the previous lane candidate group based on a moving vehicle object adjacent to the vehicle being driven and proceed to operation S31. On the other hand, in operation S29, the controller 160 may be configured to detect the previous lane candidates based on the still object and moving vehicle object present on the right and left side of the vehicle and proceed to operation S31.

In operation S31, the controller 160 may be configured to store the previous lane candidates in the storage 150 and proceed to operation S15 to extract the stored previous lane candidate group. In addition, the controller 160 may proceed to operation S33. In operation S33, the controller 160 may be configured to detect a first lane candidate group using the same method as a method for detecting the previous lane candidate group. The first lane candidate group may be detected since a lane of a road on which the vehicle is be driven may be changed and a lane of a road on which a vehicle object adjacent to the vehicle being driven is positioned may be changed. In operation S35, the controller 160 may be configured to detect whether to change a lane of a road on which the vehicle is being driven based on detecting other objects surrounding the vehicle. As the detection result of operation S35, when the lane of the road on which the vehicle is being driven is changed, the controller 160 may proceed to operation S37. When the lane of the road on which the vehicle is being driven is not changed, the controller 160 may proceed to operation S39.

Moreover, the controller 160 may to operation S37 to detect the second lane candidate group and then proceed to operation S41. In particular, when the vehicle changes the previous lane candidate group to a lane in a left direction, the controller 160 may be configured to reduce the number of lanes from the previous lane candidate group by as much as the changed number of lanes to detect the second lane candidate group. When the vehicle changes a lane to the right, the controller 160 may be configured to increase the number of lanes from the previous lane candidate group by as much as the changed number of lanes to detect the second lane candidate group. In addition, the controller 160 may proceed to operation S41. On the other hand, in operation S35, the controller 160 may proceed to operation S39 upon detecting when the lane of the road is not changed. In operation S39, the controller 160 may be configured to set the previous lane candidate group extracted in operation S15 as the second lane candidate group and may proceed to operation S41.

In operation S41, the controller 160 may be configured to detect a final lane candidate group using a combination of the first lane candidate group and the second lane candidate group. In operation S43, the controller 160 may be configured to display the detected final lane candidate group on the output unit 140. In operation S45, the controller 160 may be configured to terminate the aforementioned process upon receiving a termination signal for termination of a driving field recognition mode through the input unit 130, and proceed to operation S47 when the controller 160 does not receive the termination signal. In operation S47, the controller 160 may be configured to re-set the final lane candidate group detected in operation S41 as the previous lane candidate group and return to operation S33 to re-perform the aforementioned operations. Thus, according to the exemplary embodiments of the present invention, a driving field on which the vehicle currently is being driven may be recognized in real time until the driving field recognition mode is terminated.

Figure 3A:
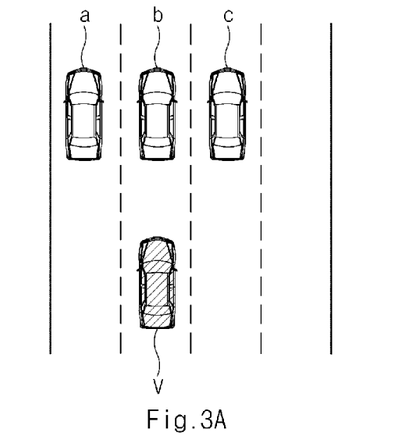
FIGS. 3A-3B are exemplary diagrams illustrating a method for recognizing a driving field of a vehicle when a still object adjacent to the vehicle is not detected, according to an exemplary embodiment of the present invention.
Figure 3B:
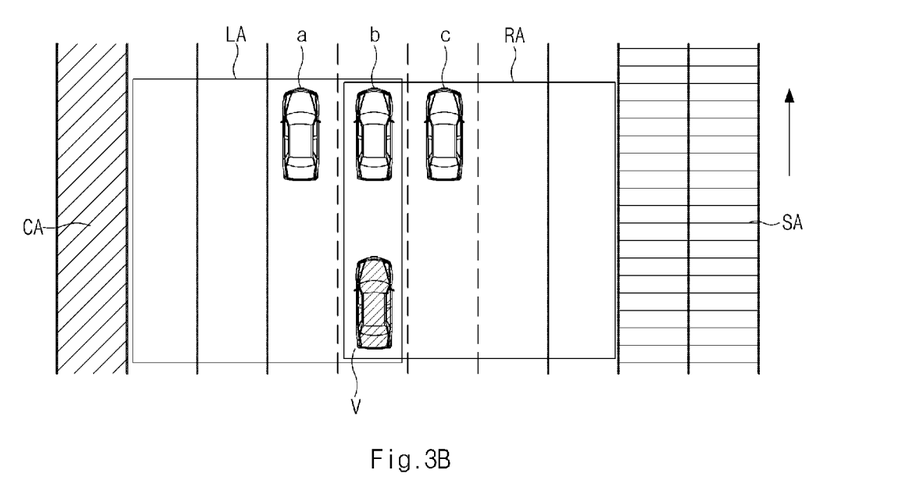
Figure 4A:
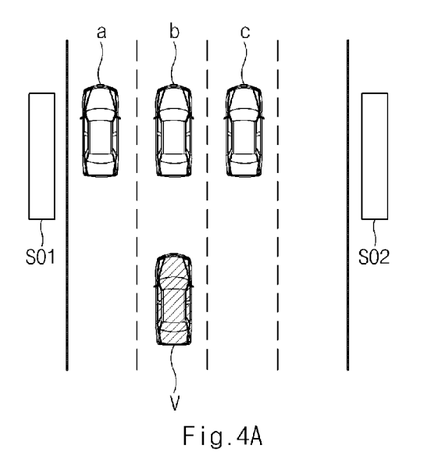
FIGS. 4A-4B are exemplary diagrams illustrating a method for recognizing a driving field of a vehicle when a still object adjacent to the vehicle is detected, according to an exemplary embodiment of the present invention.
Figure 4B:
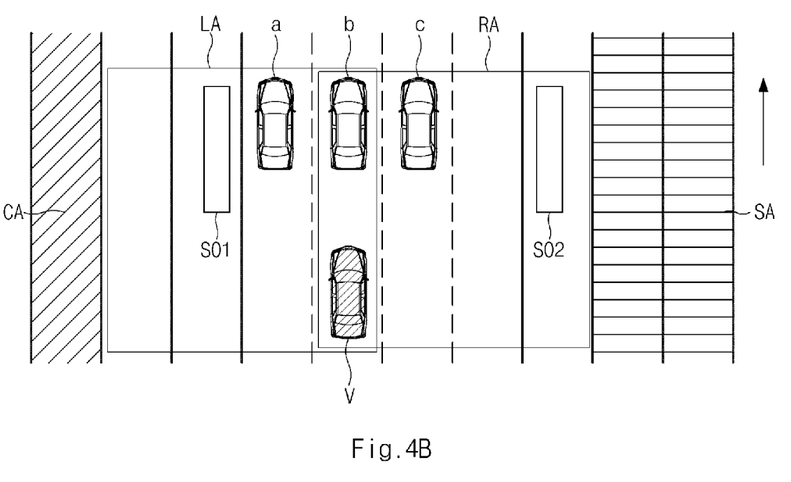
Figure 5A:
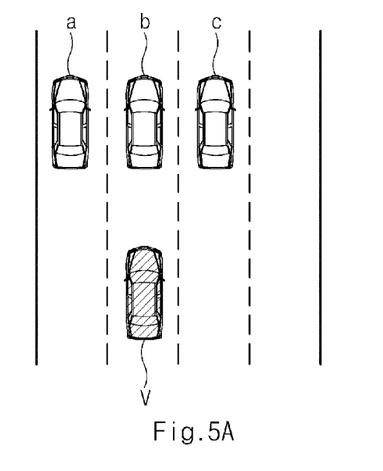
FIGS. 5A-5B are exemplary diagrams illustrating a method for recognizing a driving field of a vehicle when a lane of a road on which the vehicle is being driven is maintained, according to an exemplary embodiment of the present invention.
Figure 5B:
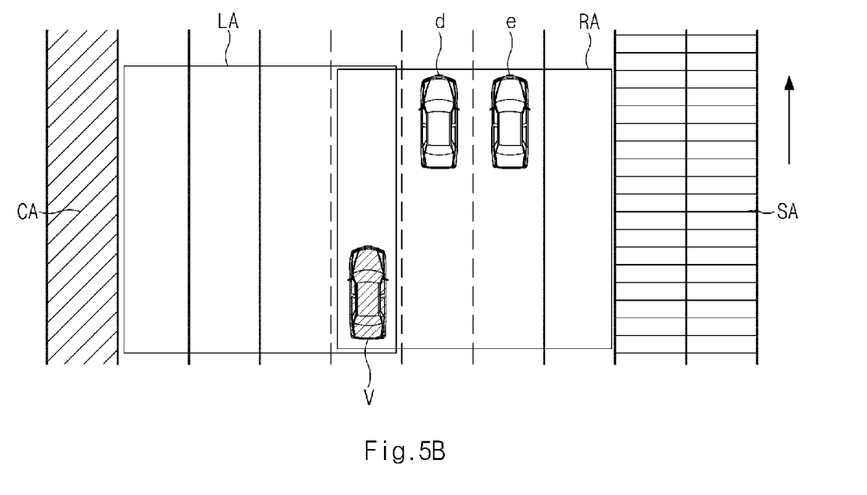
Figure 6A:
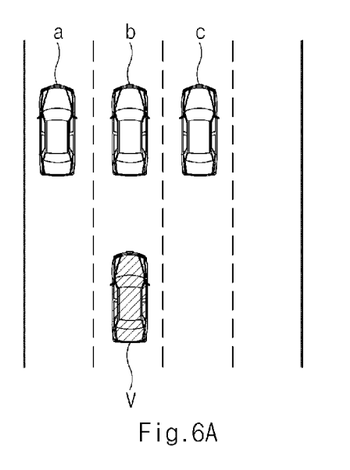
FIGS. 6A-6B are exemplary diagrams illustrating a method for recognizing a driving field of a vehicle when a lane of a road on which the vehicle is being driven is changed, according to an exemplary embodiment of the present invention.
Figure 6B:
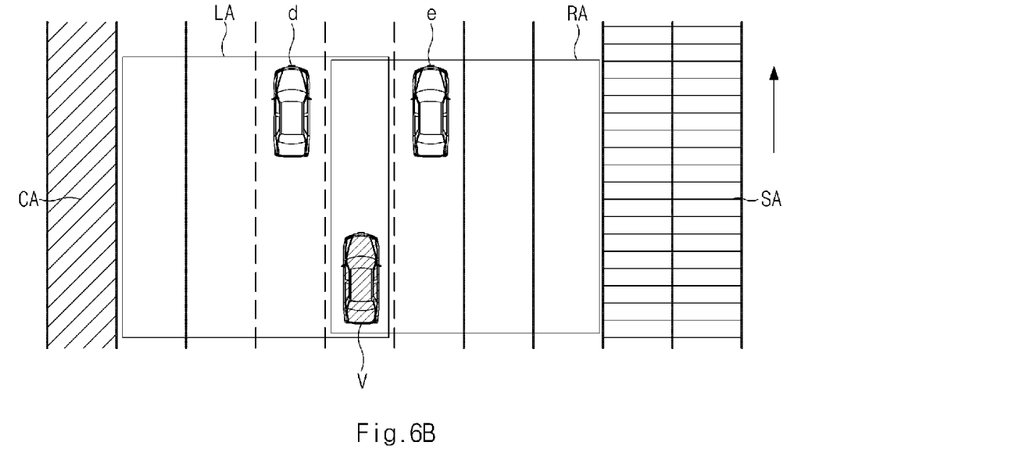

FIGS. 3A-3B are exemplary diagrams illustrating a method for recognizing a driving field of a vehicle when a still object adjacent to the vehicle is not detected, according to an exemplary embodiment of the present invention. FIGS. 4A-4B are exemplary diagrams illustrating a method for recognizing a driving field of a vehicle when a still object adjacent to the vehicle is detected, according to an exemplary embodiment of the present invention. FIGS. 5A-5B are exemplary diagrams illustrating a method for recognizing a driving field of a vehicle when a lane of a road on which the vehicle is being driven is maintained, according to an exemplary embodiment of the present invention. FIGS. 6A-6B are exemplary diagrams illustrating a method for recognizing a driving field of a vehicle when a lane of a road on which the vehicle is being driven is changed, according to an exemplary embodiment of the present invention.

With reference to FIGS. 1 and 3A-3B, when a still object is not present on the right and left side of a vehicle will now be described. As illustrated in FIG. 3A, when a vehicle V is being driven on a four-lane road, the controller 160 may be configured to set object detection driving field CA, LA, RA, and SA, as illustrated in FIG. 3B. In particular, the object detection driving fields CA, LA, RA, and SA may be set by a virtual road that includes the same number of lanes as the detected lanes on the right and left sides of the vehicle V and a virtual road that includes at least one lane. The controller 160 may be configured to generate a virtual four-lane road LA on the left side of the vehicle V, including the lane on which the vehicle V is positioned, and generate a virtual four-lane road RA on the right side of the vehicle V, including the lane on which the vehicle V is positioned. When the vehicle V is being driven in a direction indicated by an arrow shown in the drawings, the controller 160 may be configured to generate a virtual road CA for a median strip on the left of the LA and generate a virtual road SA for a guardrail on the right of the RA. In particular, a two-lane road may be allocated to the SA for a guardrail and a road shoulder.

The controller 160 may be configured to detect an object from the object detection driving fields CA, LA, RA, and SA and extract a road on which the object is positioned. The controller 160 may be configured to detect a candidate group of roads on which the vehicle V is positioned as two, three, and four-lane roads, based on a vehicle object (a), and may be configured to detect a candidate group of roads on which the vehicle V is positioned as one, two, and three-lane roads, based on a vehicle object (c). The controller 160 may further be configured to detect the set candidate group of two and three-lane roads as the previous lane candidate group using a combination of candidate groups.

With reference to FIGS. 1 to 4A-4B, when a still object is present on right and left sides of a vehicle will now be described. As illustrated in FIG. 4A, when a vehicle V is being driven on a four-lane road, the controller 160 may be configured to set object detection driving fields CA, LA, RA, and SA, as illustrated in FIG. 4B. The setting of the object detection driving fields CA, LA, RA, and SA is the same as those described with reference to FIG. 3A.

The controller 160 may be configured to detect an object from the object detection driving fields CA, LA, RA, and SA and extract a driving field on which an object is present. As the detection result of the object, as illustrated in FIGS. 4A-4B, upon detecting still objects SO1 and SO2, the controller 160 may be configured to determine that the still object is present on the right and left side of the vehicle V. In particular, the still object may be reflected when two or more still objects are detected. The controller 160 may be configured to detect a candidate group of roads on which the vehicle V is positioned as two-lane roads, based on a median strip SO1, and detect a candidate group of roads on which the vehicle V is positioned as two and three-lane roads, based on a guardrail SO2. Since the controller 160 may allocate a two-lane road to the SA, a candidate group of locations of the vehicle may be two and three-lane roads, based on the guardrail SO2. Based on the vehicle object (a), the controller 160 may be configured to detect a candidate group of driving fields on which the vehicle V is positioned as two, three, and four-lane roads. In addition, based on the vehicle object (c), the controller 160 may be configured to detect a candidate group of driving fields on which the vehicle V is positioned as one, two, and three-lane roads. The controller 160 may also be configured to detect the set candidate group of a two-lane road as the previous lane candidate group using a combination of candidate groups.

With reference to FIGS. 1 to 3B and 5A-5B, when a still object is not present on right and left sides of a vehicle and a lane of a road of the vehicle is not changed will now be described. As illustrated in FIG. 5B, the controller 160 may be configured to set object detection driving fields CA, LA, RA, and SA. The setting of the object detection driving fields CA, LA, RA, and SA is the same as those described with reference to FIG. 3A. The controller 160 may be configured to detect a first lane candidate group using the same method as a method for detecting the previous lane candidate group. In FIG. 5B, since a vehicle object is not present on the left side of the vehicle V, the controller 160 may be configured to detect a candidate group of roads on which the vehicle V is positioned as one, two, three, and four-lane roads, and detect a candidate group of roads on which the vehicle V is positioned as one and two-lane roads, based on a vehicle object e present in a last lane on the right of the vehicle V. The first lane candidate group detected using a combination of the detected candidates may be one and two-lane roads.

Then, the controller 160 may be configured to detect a second lane candidate group. In particular, since a lane of the vehicle V is not changed, the second lane candidate group may be the same as the previous lane candidate group detected in FIGS. 3A-3B. The controller 160 may also be configured to detect a two-lane road obtained using a combination of one and two-lane roads as the detected first lane candidate group and two and three-lane roads as the second lane candidate group as a final lane candidate group the vehicle V.

With reference to FIGS. 1 to 3B and 6A-6B, when a still object is not present on right and left side of a vehicle and a lane of a road of the vehicle is changed will now be described. As illustrated in FIG. 6B, the controller 160 may be configured to set object detection driving fields CA, LA, RA, and SA. The setting of the object detection driving fields CA, LA, RA, and SA is the same as those described with reference to FIG. 3A. The controller 160 may be configured to detect a first lane candidate group using the same method as a method for detection of the previous lane candidate group. In FIG. 6B, the controller 160 may be configured to detect a candidate group of roads on which the vehicle V is positioned as two, three, and four-lane roads, based on a vehicle object d present on the left of the vehicle V, and detect a candidate group of roads on which the vehicle V is positioned as one, two, and three-lane roads, based on a vehicle object e present on the right of the vehicle V. The first lane candidate group detected using a combination of the detected candidates may be two and three-lane roads.

Then, the controller 160 may be configured to detect a second lane candidate group. In particular, since the lane of the vehicle V is changed to the right by one lane compared with in FIG. 6A, the controller 160 may be configured to add one lane (+1) to the previous lane candidate group detected in FIGS. 3A-3B to detect the second lane candidate group. Thus, the second lane candidate group may be three and four-lane roads. The controller 160 may also be configured to detect a three-lane road obtained using a combination of two and three-lane roads as the detected first lane candidate group and three and four-lane roads as the second lane candidate group as a final lane candidate group the vehicle V.

According to the aforementioned exemplary embodiments of the present invention, locations of lanes of a road, another vehicle, and a guard rail, adjacent to a vehicle, may be extracted using a GPS, an image sensor, and a radar sensor to detect a driving field of the vehicle. In addition, according to the aforementioned exemplary embodiments of the present invention, whether to change a lane of a road of the vehicle may be determined in real time to detect a driving field of the vehicle in real time.

Herein, an apparatus and method for recognizing a driving field of a vehicle have been described with regard to exemplary embodiments of the present invention. It should be interpreted that the scope of the present invention is defined by the following claims rather than the above-mentioned detailed description and all modifications or alterations deduced from the meaning, the scope, and equivalences of the claims are included in the scope of the present invention.

What is claimed is:

1. An apparatus for recognizing a driving field of a vehicle, comprising:
  a sensor configured to sense a location of the vehicle being driven on a road and sense first one or more objects on a right side of the vehicle and second one or more objects on a left side of the vehicle; and
  a controller configured to:
    determine a number of lanes of the road on which the vehicle is driven by accessing map data that corresponds to the sensed location of the vehicle;
    detect whether the object is present and the vehicle changes a lane to detect a final lane candidate group on which the vehicle is being driven based on the sensed first one or more objects on the right side of the vehicle and the sensed second one or more objects on the left side of the vehicle; and
    display the final lane candidate group.

2. The apparatus according to claim 1, wherein the controller is further configured to: additionally set a virtual road having the same number of lanes as the detected lane of the road, containing a lane of the vehicle, on the right and left side of the vehicle, and a virtual road having at least one lane; and detect a previous lane candidate group based on the detected object.

3. The apparatus according to claim 2, wherein the controller is further configured to: detect a first lane candidate group by setting a virtual road having the same number of lanes as the detected lane of the road, containing a lane of the vehicle, on the right and left side of the vehicle, and a virtual road having at least one lane, when the lane of the road on which the vehicle is being driven is changed; and reduce and increase the number of lanes by as much as the changed number from the previous lane candidate group to detect a second lane candidate group.

4. The apparatus according to claim 3, wherein the controller is further configured to: detect a first lane candidate group by setting a virtual road having the same number of lanes as the detected lane of the road, containing a lane of the vehicle, on the right and left side of the vehicle, and a virtual road having at least one lane, when the lane of the road on which the vehicle is being driven is maintained; and set the previous lane candidate group as the second lane candidate group.

5. The apparatus according to claim 4, wherein the controller is configured to combine the first lane candidate group and the second lane candidate group to detect the final lane candidate group.

6. The apparatus according to claim 2, wherein the object includes a vehicle object adjacent to the vehicle being driven and a still object including a guardrail and a median strip positioned on the road on which the vehicle is positioned.

7. A method for recognizing a driving field of a vehicle, comprising:
  entering, by a controller, a driving field recognition mode based on an external input;
  detecting, by the controller, a number of lanes of a road on which the vehicle is being driven by accessing map data that corresponds to a location of the vehicle;
  generating, by the controller, a virtual road having the same number of lanes as the detected number of lanes on a right and left side of the vehicle based on the location of the vehicle and the virtual road having at least one lane;
  detecting, by the controller, whether first one or more objects are on a right side of the vehicle and second one or more objects are on a left side of the vehicle;
  detecting, by the controller, a first lane candidate group based on the detected first one or more objects on the right side of the vehicle and the detected second one or more objects on the left side of the vehicle and the generated virtual road;
  detecting, by the controller, whether a lane of the road on which the vehicle is being driven is changed;
  detecting, by the controller, a second lane candidate group based on a previous lane candidate group according to whether the lane of the road on which the vehicle is being driven is changed;
  detecting, by the controller, a final lane candidate group by combining the first lane candidate group and the second lane candidate group; and
  displaying, by the controller, the detected final lane candidate group.

8. The method according to claim 7, wherein the detecting of the first lane candidate group and the second lane candidate group includes:
  detecting, by the controller, the first lane candidate group by setting the virtual road having the same number of lanes as the detected lane of the road, containing a lane of the vehicle, on the right and left side of the vehicle, and the virtual road having at least one lane, in response to detecting that the lane of the road on which the vehicle is being driven is changed, and reducing and increasing the number of lanes by as much as the changed number from the previous lane candidate group to detect the second lane candidate group; and
  detecting, by the controller, the first lane candidate group by setting the virtual road having the same number of lanes as the detected lane of the road, containing a lane of the vehicle, on the right and left side of the vehicle, and the virtual road having at least one lane, in response to determining that the lane of the road on which the vehicle is being driven is maintained, and setting the previous lane candidate group as the second lane candidate group.

9. A non-transitory computer readable medium containing program instructions executed by a controller, the computer readable medium comprising:
  program instructions that enter a driving field recognition mode based on an external input;
  program instructions that detect a number of lanes of road on which the vehicle is being driven by accessing map data that corresponds to a location of the vehicle;
  program instructions that generate a virtual road having the same number of lanes as the detected number of lanes on a right and left side of the vehicle based on the location of the vehicle and the virtual road having at least one lane to set the driving field of the object;
  program instructions that detect whether first one or more objects are on a right side of the vehicle and second one or more objects are on a left side of the vehicle;
  program instructions that detect a first lane candidate group based on the detected first one or more objects on the right side of the vehicle and the detected one or more objects on the left side of the vehicle and the generated virtual road;
  program instructions that detect whether a lane on which the vehicle is being driven is changed;
  program instructions that detect a second lane candidate group based on a previous lane candidate group according to whether the lane of the road on which the vehicle is being driven is changed;
  program instructions that detect a final lane candidate group by combining the first lane candidate group and the second lane candidated group; and
  program instructions that display the detected final lane candidate group.

10. The non-transitory computer readable medium of claim 9, wherein the detecting of the first lane candidate group and the second lane candidate group includes:
  program instructions that detect the first lane candidate group by setting the virtual road having the same number of lanes as the detected lane of the road, containing a lane of the vehicle, on the right and left side of the vehicle, and the virtual road having at least one lane, in response to detecting that the lane of the road on which the vehicle is being driven is changed, and reduce and increase the number of lanes by as much as the changed number from the previous lane candidate group to detect the second lane candidate group; and
  program instructions that detect the first lane candidate group by setting the virtual road having the same number of lanes as the detected lane of the road, containing a lane of the vehicle, on the right and left side of the vehicle, and the virtual road having at least one lane, in response to determining that the lane of the road on which the vehicle is being driven is maintained, and set the previous lane candidate group as the second lane candidate group.

* * * * *